US011966188B2

(12) United States Patent
You et al.

(10) Patent No.: US 11,966,188 B2
(45) Date of Patent: Apr. 23, 2024

(54) JAM DETECTION OF IMAGE FORMING APPARATUS BASED ON SIZE OF MOTOR CURRENT

(71) Applicant: Hewlett-Packard Development Company, L.P., Spring, TX (US)

(72) Inventors: Yong-Ho You, Seongnam-si (KR); Hyoungil Kim, Seongnam-si (KR); Kiho Park, Seongnam-si (KR); Minkeun Song, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 537 days.

(21) Appl. No.: 17/058,823

(22) PCT Filed: Jun. 12, 2019

(86) PCT No.: PCT/US2019/036697
§ 371 (c)(1),
(2) Date: Nov. 25, 2020

(87) PCT Pub. No.: WO2020/023122
PCT Pub. Date: Jan. 30, 2020

(65) Prior Publication Data

US 2021/0208531 A1 Jul. 8, 2021

(30) Foreign Application Priority Data

Jul. 25, 2018 (KR) ........................ 10-2018-0086701

(51) Int. Cl.

*G03G 15/00* (2006.01)
*B65H 7/12* (2006.01)
*G03G 15/20* (2006.01)

(52) U.S. Cl.

CPC ............... *G03G 15/70* (2013.01); *B65H 7/12* (2013.01); *G03G 15/2039* (2013.01);
(Continued)

(58) Field of Classification Search

None
See application file for complete search history.

(56) References Cited

U.S. PATENT DOCUMENTS 6,722,754 B1 4/2004 Delaney et al.
9,415,961 B2 8/2016 Nobuta et al.
(Continued)

FOREIGN PATENT DOCUMENTS

CN 102117415 A 7/2011
CN 102950889 A 3/2013
(Continued)

OTHER PUBLICATIONS

Machine translation of JP20010158139A (Year: 2001).*
(Continued)

*Primary Examiner* — Matthew G Marini
(74) *Attorney, Agent, or Firm* — Foley & Lardner LLP

(57) ABSTRACT

An image forming apparatus is provided. The image forming apparatus includes a print engine to perform an image forming job, a motor to drive the print engine, a driving circuit, to supply a power to the motor, and including a sensor to sense an amount of current of the power supplied to the motor, and a processor to analyze a frequency component of the current supplied to the motor by using the amount of current sensed by the sensor for a predetermined time, and to determine an occurrence of a jam based on the analyzed frequency component.

19 Claims, 9 Drawing Sheets

(52) U.S. Cl.
CPC .... *B65H 2511/528* (2013.01); *B65H 2515/70* (2013.01); *B65H 2557/24* (2013.01)

(56) References Cited

U.S. PATENT DOCUMENTS

| | | | | |
|---|---|---|---|---|
| 9,639,038 | B1 * | 5/2017 | Cao | G03G 15/2039 |
| 2005/0095022 | A1 * | 5/2005 | Fujisawa | G03G 15/205 399/70 |
| 2012/0217702 | A1 | 8/2012 | Seki | |
| 2014/0356007 | A1 * | 12/2014 | Kurokawa | G03G 15/2032 399/70 |

FOREIGN PATENT DOCUMENTS

| | | | |
|---|---|---|---|
| CN | 103930280 | A | 7/2014 |
| CN | 103969983 | A | 8/2014 |
| CN | 105564048 | A | 5/2016 |
| JP | 8-278712 | A | 10/1996 |
| JP | 11-98895 | A | 4/1999 |
| JP | 2001-158139 | A | 6/2001 |
| JP | 2003-192188 | A | 7/2003 |
| JP | 2003-248409 | A | 9/2003 |
| JP | 2007-62940 | A | 3/2007 |
| JP | 2010-26462 | A | 2/2010 |
| JP | 2013-25060 | A | 2/2013 |
| WO | WO-2013/025749 | A1 | 2/2013 |
| WO | WO-2017/164660 | A1 | 9/2017 |
| WO | WO-2020/027983 | A1 | 2/2020 |

OTHER PUBLICATIONS

Mohamed El Hachemi Benbouzid, Member, IEEE, Michelle Vieira, and Celine Theys, Induction Motors' Faults Detection and Localization Using Stator Current Advanced Signal Processing Techniques, IEEE Transactions on Power Electronics, vol. 14, No. 1, Jan. 1999 (Year: 1999).*

* cited by examiner

JAM DETECTION OF IMAGE FORMING APPARATUS BASED ON SIZE OF MOTOR CURRENT

BACKGROUND

An image forming apparatus is an apparatus which performs generation, printing, reception, and transmission of image data. Representative examples of an image forming apparatus include a printer, a copier, a scanner, a facsimile, and a multifunction peripheral (MFP) in which functions of the above-described devices are combined.

In recent years, an image forming apparatus may have a paper sensor installed therein for sensing whether an input paper is discharged to detect the occurrence of a jam, or may detect an amount of current provided to a motor of an image forming apparatus.

BRIEF DESCRIPTION OF THE DRAWINGS

The above and/or other aspects will become more apparent by reference to examples which are illustrated in the appended drawings. Understanding that these drawings depict only examples and are not therefore to be considered to be limiting of the scope of the disclosure, the principles herein are described and explained with additional specificity and detail via the use of the accompanying drawings, in which.

The same reference numerals are used to represent the same elements throughout the drawings.

DETAILED DESCRIPTION

One or more examples will be described below in greater detail with reference to the accompanying drawings. The examples described below may be modified and implemented in various different forms. In order to more clearly describe the features of the examples, a detailed description of known matters to those skilled in the art will be omitted.

In the present disclosure, a case in which any one feature is connected with another feature includes a case in which the features are directly connected with each other and a case in which the features are indirectly connected (e.g., electrically connected) with each other with other features interposed therebetween. Further, when a certain feature is stated as "comprising" another feature, unless otherwise stated, this means that the certain feature may include still other features, rather than foreclosing the same.

The term "image forming job" as used herein may mean various jobs related to the image (e.g., printing, copying, scanning, or faxing), such as forming an image or creating/storing/transmitting an image file. In addition, the term "job" may mean not only an image forming operation but also a series of processes necessary for performing an image forming operation.

An image forming apparatus generally operates to output print data generated at a terminal such as a computer onto a printing paper. An example of an image forming apparatus includes a copier, a printer, a facsimile, a scanner, and a multifunction printer (MFP) that provides combined functionality of at least two of the single apparatuses. The image forming apparatus may refer to any apparatus capable of performing an image forming operation, such as a copier, a printer, a scanner, a fax machine, an MFP, a display apparatus, or the like.

In addition, the term "print data" may refer to data that is converted into a format printable in a printer. Meanwhile, if a printer supports direct printing, the file itself may be print data.

In addition, the term "user" may refer to a person who performs an operation related to an image forming operation using an image forming apparatus or a device connected to the image forming apparatus via wire or wirelessly. In addition, the term "manager" may refer to a person who has the authority to access all functions and the system of the image forming apparatus. The "manager" and the "user" may be the same person.

Figure 1:
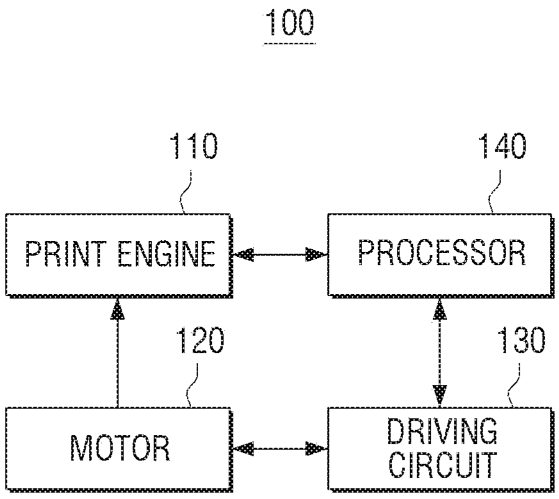
FIG. 1 is a block diagram illustrating a brief configuration of an image forming apparatus, according to an example.

FIG. 1 is a block diagram illustrating a brief configuration of an image forming apparatus, according to an example.

Referring to FIG. 1, an image forming apparatus 100 may include a print engine 110, a motor 120, a driving circuit 130, and a processor 140.

The print engine 110 may perform an image forming job. For example, the print engine 110 may perform the image forming job under the control of the processor 140 and the start of the motor 120. An example configuration of the print engine 110 will be described later with reference to FIG. 3.

The motor 120 starts and drives the print engine 110. For example, the motor 120 may be included within the image forming apparatus 100, and may include a DC motor, a step motor, a brushless DC (BLDC) motor, or the like. The motor 120 may perform various functions of the image forming apparatus, such as driving an organic photo conductor (OPC) in the print engine 110, driving a fuser, transferring paper, or the like. Although FIG. 1 illustrates only one motor, in other examples, a plurality of motors may be included in the image forming apparatus 100.

The driving circuit 130 may generate a driving signal with respect to the motor 120 according to a driving command. In addition, the driving circuit 130 may provide a predetermined power to the motor 120. For example, when the motor 120 is a step motor, the driving circuit 130 may receive a driving command (e.g., current magnitude information, speed information, etc.), provide a constant current to the step motor in response to the received current magnitude information, and provide an impulse driving signal corresponding to the speed information to the step motor. In addition, when the motor 120 is a BLDC motor, the driving circuit 130 may receive speed information, provide a predetermined constant voltage to the BLDC motor, and provide a driving signal corresponding to the received speed information to the BLDC motor. An example configuration and operation of the driving circuit 130 will be described later with reference to FIG. 5.

The driving circuit 130 may determine an amount of current provided to the motor. For example, the driving circuit 130 may output current data which indicates an amount of current sensed at predetermined time intervals. In addition, the output current data may be converted to a digital signal of N bits through an analog to digital converter (ADC) port.

The processor 140 may control respective configurations in the image forming apparatus 100. For example, when print data is received from a print control terminal apparatus, the processor 140 may control an operation of the print engine 110 to print the received print data, and transmit a driving command for the motor 120 that starts the print engine 110 to the driving circuit 130. For example, the processor 140 may transmit a driving command for the motor 120 such as a rotation start/stop, acceleration/moderation, a velocity reference value command, and the like to the driving circuit 130.

In addition, when the motor 120 to be controlled is a step motor, the processor 140 may provide, to the driving circuit 130, a current reference value (Vref) (hereinafter referred to as 'constant current control value') as a driving command so that a predetermined constant current is provided to the step motor. In this regard, the constant current control value may be in the form of a pulse-width modulation (PWM) signal.

In addition, when the motor 120 to be controlled includes a brake member, the processor 140 may provide an operation command of the brake member as a driving command to the driving circuit 130.

In addition, the processor 140 may determine the occurrence of a jam based on the current data converted to a digital signal of N bits. As an example, the processor 140 may analyze a frequency component for a current provided to a motor by using the current data and determine the occurrence of a jam occurrence based on the analyzed frequency component.

For example, the processor 140 may, using the current data, calculate a function in a time domain representing a current provided to the motor, convert the calculated function to a frequency domain, and determine the occurrence of a jam based on the conversion result. An example of a method for converting a function in the time domain into a frequency component may include a method of transform to an expression of amplitude and phase, a Laplace transform, a Z transform, a Fourier transform, etc.

In addition, the processor 140 may determine the occurrence of a jam using a frequency component corresponding to a frequency band to be sensed, without using a frequency component of the entire frequency band from among the analyzed frequency components. The frequency to be sensed may refer to a frequency band in which a change of a frequency component occurs when a jam occurs from among the entire frequency band.

For example, in a case in which a jam corresponding to a paper that is rolled in a fuser is to be determined, a target of current sensing of the driving circuit 130 is a current provided to a motor driving the fuser. In addition, the frequency to be sensed may be any one of a rotation frequency of a fusing roller such as a fuser belt or a heat roller of a fuser, harmonics of a rotation frequency of a fusing roller, a mesh frequency of a gear rotating a fusing roller, or the like.

For example, in a case in which a rotation frequency of a fusing roller is 1.5 Hz, the processor 140 may determine whether a jam has occurred using a component of a 1.5 Hz band from among the result of a transform to the frequency domain.

In addition, the processor 140 may identify a component corresponding to a frequency band to be sensed from among the analyzed frequency components. In addition, the processor 140 may determine an occurrence of a jam based on a frequency component of a frequency band to be sensed and a frequency of a frequency band to be sensed during normal operation.

As an example, the processor 140 may identify a size of a frequency band to be sensed from among the analyzed frequency components. In addition, the processor 140 may determine an occurrence of a jam by comparing the identified frequency band size with a size of the frequency band during normal operation. For example, in a case in which the identified size of the frequency band is increased by a predetermined value compared with the size of the frequency band during normal operation, the processor 140 may identify that a jam has occurred.

In addition, the processor 140 may determine a fluctuation rate indicating a degree to which a size of a frequency band to be sensed from among the analyzed frequency components is increased as compared with a size of a frequency band to be sensed during normal operation. In addition, in a case in which the determined fluctuation rate exceeds a predetermined value, the processor 140 may identify that a jam has occurred.

For example, in a case in which a fluctuation rate of a size of a frequency band to be sensed reaches 15%, the processor 140 may identify that a jam has occurred.

In addition, for more precise determining of the occurrence of a jam, the processor 140 may determine an average value of an amount of current determined by the driving circuit 130, and detect an occurrence of a jam based on both the determined average value of the amount of current and the analyzed frequency component.

As an example, the processor 140 may determine an occurrence of a jam based on a comparison of the determined average value of the amount of current with an amount of current during normal operation of the image forming apparatus 100 and based on a comparison of the analyzed frequency component with a frequency component during normal operation of the image forming apparatus 100.

The comparison method may include a method of identifying whether a difference between an amount of current and a size of a frequency band to be sensed during normal operation exceeds a predetermined value, a method of identifying whether an amount of current or a fluctuation rate of a frequency band to be sensed exceeds a predetermined value compared with a case of a normal operation of the image forming apparatus 100, etc., but is not limited thereto.

An example of determining the occurrence of a jam based on a frequency component will be described later with reference to FIGS. 7A to 7D and 8.

In an example, the processor 140 may receive current data determined by the driving circuit 130 for a predetermined time, and determine whether a jam has occurred using the received current data. In a case in which a jam has occurred, the processor 140 may take follow-up measures which will be described below.

As an example, in a state in which a jam has occurred, the processor 140 may receive current data for an amount of current measured by the driving circuit 130 for a substantial amount of time in order to determine whether a jam has occurred. In this case, when a remaining paper is present in a fuser, etc., a time for which heat is applied to the remaining paper is increased as well. Accordingly, the possibility that an apparatus may be damaged due to heat may be increased before the processor 140 senses an occurrence of a jam and controls the temperature of the fuser to be lowered.

To lower the possibility of the occurrence of an accident, the processor 140 may set the above-mentioned predetermined time to be within a range that satisfies a minimum time required to obtain sufficient current data to determine the occurrence of a jam.

The minimum time required for the processor 140 to obtain sufficient current data to determine the occurrence of a jam may differ depending on a frequency to be sensed. For example, in order to determine the occurrence of a jam, it is necessary that the processor 140 obtains a frequency component corresponding to a frequency band to be sensed. In addition, to obtain a frequency component corresponding to a frequency band to be sensed, the processor 140 requires a frequency resolution at a predetermined level.

The frequency resolution increases as the measurement time increases and decreases as a sampling frequency Fs increases. Accordingly, to maintain a predetermined level of frequency resolution, it is necessary to adjust a measurement time according to the sampling frequency Fs. The sampling frequency Fs should be set to a value at least twice that of a frequency to be sensed so that a frequency component corresponding to the frequency band to be sensed may be obtained without distortion.

As described above, a predetermined level of frequency resolution is required to obtain a frequency component corresponding to a frequency band to be sensed and the frequency resolution is changed according to a measurement time and a frequency to be sensed. Thus, the minimum time required may differ according to a frequency to be sensed.

For example, in a case in which a frequency to be sensed is 3 Hz, in order to obtain the same resolution as a frequency resolution in a case where a frequency to be sensed is 1.5 Hz, it is necessary to receive current data for a longer time than the case where the frequency to be sensed is 1.5 Hz.

In addition, the processor 140 may determine whether a jam has occurred using current data sensed by the driving circuit 130 after a predetermined time from when the motor 120 started operating. For example, a large amount of current is supplied during an initial operation of the motor 120, So as not to determine a phenomenon of an initial sudden current increase as indicating that a jam has occurred, the processor 140 may use current data after the elapse of a time required for the motor 120 to start operating and enter an interval of maintaining a stable speed.

In addition, in a case in which it is determined that a jam has occurred, the processor 140 may lower a fusing temperature of a fuser. For example, there may be a case where, in a state in which the paper that has been the cause of jamming is not removed, an operation command for the image forming apparatus 100 is input and warm-up of the fixing apparatus is required. In this case, heat is applied to a remaining paper due to a high fusing temperature and there may be a possibility that an apparatus may be damaged due to heat of the remaining paper.

Accordingly, in a case in which it is determined that a jam has occurred, the processor 140 may store jam occurrence information. Thereafter, in a case in which a warm-up of a fuser is required, the processor 140 may identify the stored jam occurrence information, determine whether a jam has occurred again in a state in which the possibility that an apparatus may be damaged due to heat of the remaining paper is reduced by lowering a fusing temperature of the fuser, and identify whether the remaining paper is removed.

In addition, in a case in which it is determined that a jam has occurred, the processor 140 may control the fuser not to be heated. This is also intended to prevent the possibility of apparatus failure or damage due to the heat of the remaining paper caused by the high fusing temperature in the state where the remaining paper, which is the cause of the jamming, is not removed.

Accordingly, when it is determined that a jam has occurred, the processor 140 may store jam occurrence information. In a case in which an operation command in need of warm-up of a fuser is received thereafter, the processor 140 may control such that the fuser is not heated, determine jamming again, and identify whether the remaining paper is removed.

In addition, in a case in which it is determined that a jam has occurred, the processor 140 may suspend driving of the motor 120. For example, when it is determined that a jam has occurred, the processor 140 may suspend an operation currently in progress.

In addition, in a case in which the current determined by the driving circuit 130 is a current provided to the motor 120 that is driving a fusing roller and accordingly, a frequency to be sensed is a rotation frequency of the fusing roller, when it is determined that a jam has occurred, the processor 140 may identify an area in which the remaining paper is disposed from among a surface of the fusing roller by using the received current data and the rotation frequency of the fusing roller.

For example, the processor 140 may, based on determined current data, identify a time point or interval at which an amount of current repeatedly increases by a period of one rotation of the fusing roller according to a time axis. A time point or interval at which an amount of current repeatedly increases may correspond to a position at which the remaining paper comes into contact with a fusing roller and a load increases. Thus, the processor 140 may identify an area at which the remaining paper is disposed.

In addition, the processor 140 may control the motor 120 to move to a position at which a user is capable of, when a cover of the image forming apparatus 100 is opened, visually identifying an area in which the remaining paper in contact with a fusing roller when an operation of the motor 120 is stopped is positioned.

In addition, in a case in which it is determined that an occurred jam is not removed for a certain time, the processor 140 may automatically notify a management server corresponding to a service center of the corresponding error.

In the above example, a current provided to one motor is determined, and it is further determined whether a jam has occurred using a frequency component of the current. However, a plurality of motors may be provided in the image forming apparatus 100. In this case, it is possible to determine current provided to each of the plurality of motors and to identify whether a jam has occurred using a frequency component of each current.

In the above example, the processor 140 may identify whether a jam has occurred. In various examples, the driving circuit 130 may identify whether a jam has occurred, and that only when identifying that a jam has occurred, the driving circuit 130 may transfer information relating to the jamming to the processor 140.

It is illustrated in FIG. 1 that the motor 120 and the driving circuit 130 are separately configured. During implementation, however, the motor 120 may be implemented as a configuration in the driving circuit 130.

Although the above illustrates and explains a constitution of the image forming apparatus, various new devices may be additionally included in actual implementation. Examples will be explained below by referring to FIG. 2.

Figure 2:
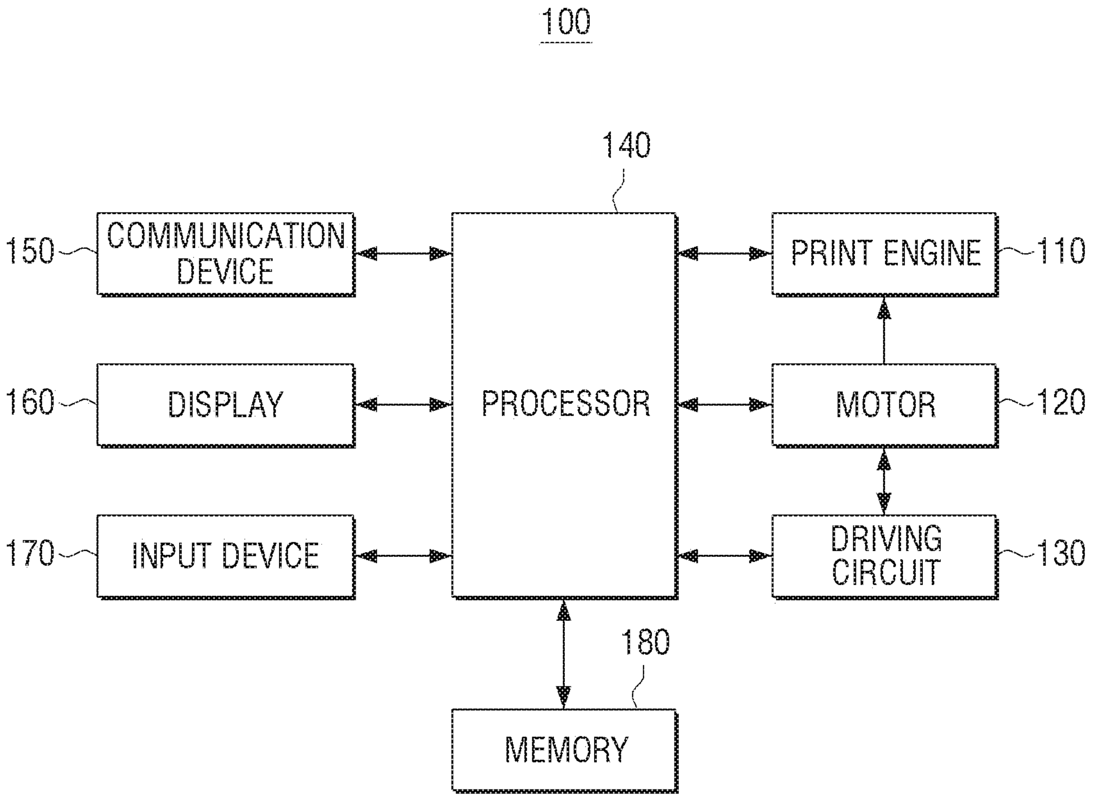
FIG. 2 is a block diagram illustrating a more specific configuration of an image forming apparatus, according to an example.

FIG. 2 is a block diagram illustrating a more specific configuration of an image forming apparatus, according to an example.

Referring to FIG. 2, the image forming apparatus 100 may include the print engine 110, the motor 120, the driving circuit 130, the processor 140, a communication device 150, a display 160, an input device 170, and a memory 180.

The print engine 110, the motor 120, and the processor 140 have been described above with reference to FIG. 1, and thus, a description thereof will be omitted.

The communication device 150 may be connected to a print control terminal device (not illustrated), and receive print data from the print control terminal device. For example, the communication device 150 may be formed to connect the image forming apparatus 100 to an external apparatus, and may be connected via not only a local area network (LAN) or the Internet but also a universal serial bus (USB) port or a wireless communication (e.g., Wi-Fi 802.11a/b/g/n, near field communication (NFC), Bluetooth, etc.) port. In this regard, a print control terminal device may be a general personal computer (PC) or a laptop PC, and may be a mobile device such as a smart phone.

In addition, when jamming is determined in the image forming apparatus 100, the communication device 150 may provide information relating to the jamming to a management server corresponding to a service center.

The display 160 may display various information provided from the image forming apparatus 100. For example, the display 160 may display an operation state of the image forming apparatus 100, or may display a user interface window for selecting functions or options that are available to the user.

Further, the display 160 may display an operation state of the image forming apparatus 100. In addition, when jamming is determined, the display 160 may include information including jamming guide information, manual information for addressing the jamming, contact information (or how to contact) a service center, etc.

Further, the input device 170 may include a plurality of keys (e.g., function keys) with which the user may set or select various functions supported by the image forming apparatus 100. Through the above process, the user may input various driving commands with respect to the image forming apparatus 100.

The memory 180 may store print data. For example, the memory 180 may store print data that is received through the communication device 150 described above. The memory 180 may be implemented to be an external storage medium, a removable disk that includes a USB memory, and/or a web server through a network as well as a storage medium within the image forming apparatus 100.

In addition, the memory 180 may store a lookup table usable to control the motor 120. Here, the lookup table may be an acceleration table having pulse cycle information for driving speeds of the step motor, and may be a speed (or acceleration) table corresponding to a plurality of load voltages (Vload), a lookup table for torque values that correspond to a plurality of load voltages (Vload), a lookup table for constant current control voltage (Vref) values or control voltage values that correspond to the plurality of load voltages (Vload), or the like.

In addition, the memory 180 may store information that relates to a frequency component for a current provided to a motor during normal operation, and the information may be used to identify whether a jam has occurred or not. Accordingly, the processor 140 may analyze a frequency component by using current data determined by the driving circuit 130, and compare the analyzed frequency component with information relating to a frequency component during normal operation stored in the memory 180 so that jamming may be determined.

In addition, the memory 180 may store frequency component information for a case of a simple increase of load by some element of the print engine 110 or a life of the motor 120. Accordingly, the processor 140 may distinguish a case of a load increase by some element of the print engine 110 or a life of the motor 120 from a case where a jam has occurred, and may prevent misjudgment that a jam has occurred.

In addition, the memory 180 may store information that relates to an amount of current provided to a motor during normal operation, and the information may be used to identify whether a jam has occurred or not. Accordingly, the processor 140 may determine whether a jam has occurred using both the frequency component for a current provided to a motor during normal operation and information relating to an amount of current as mentioned above.

In addition, the memory 180 may store current data which indicates an amount of current sensed at predetermined time intervals by the driving circuit 130.

In the above examples, the memory 180 may store frequency component information of a current provided to a motor during normal operation. However, in other examples, the frequency component information of the current provided to the motor during normal operation may be stored in the driving circuit 130 or the processor 140, which will be described later.

As described above, the image forming apparatus 100 may determine whether a jam has occurred without using a paper sensor sensing whether a paper input into the image forming apparatus is discharged. In addition, unlike a case of determining whether a jam has occurred based on an amount of current provided to a motor, the image forming apparatus 100 according to an example may determine whether a jam has occurred based on a frequency component of current provided to the motor. Accordingly, a case of a simple load increase based on a life of a motor, etc. and a case of an actual occurrence of a jam may be distinguished from each other.

Figure 3:
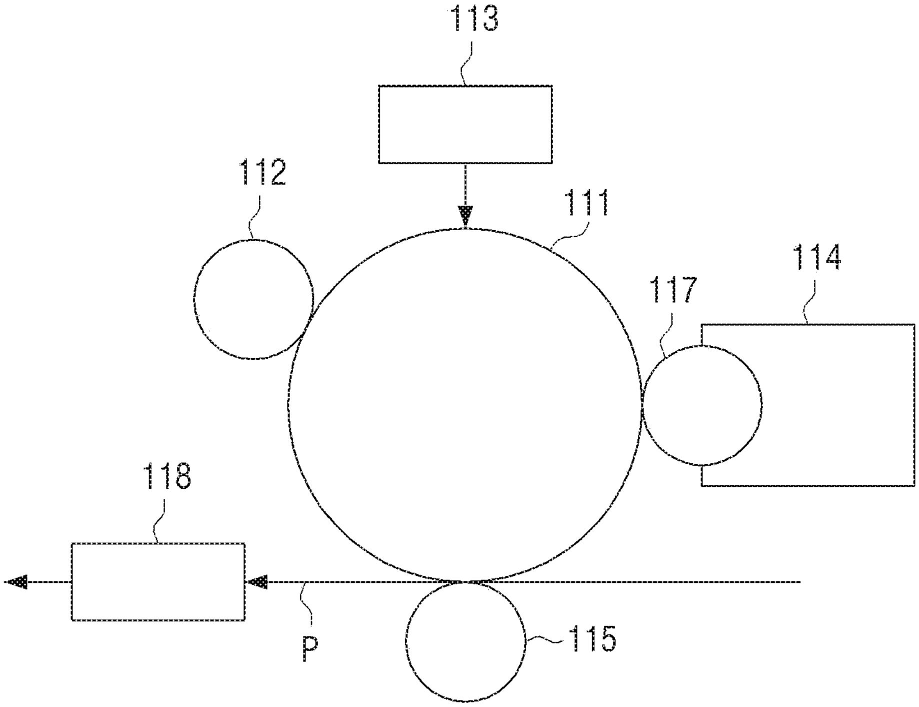
FIG. 3 is a diagram of a print engine, according to an example.

FIG. 3 is a diagram of a print engine, according to an example.

Referring to FIG. 3, the print engine may include a photosensitive drum 111, a charger 112, an exposure apparatus 113, a developer 114, a transferring apparatus 115, and a fuser 118.

The print engine may further include a feeding means (not illustrated) which supplies a printing medium (P). An electrostatic latent image is formed on the photosensitive drum 111. The photosensitive drum 111 may be referred to as a photosensitive drum, a photosensitive belt, and the like, according to its form.

The charger 112 charges the surface of the photosensitive drum 111 to a uniform potential. The charger 112 may be implemented as a corona charger, a charging roller, a charging brush, and the like.

The exposure apparatus 113 may change the surface potential of the photosensitive drum 111 based on information on an image to be printed to form an electrostatic latent image on the surface of the photosensitive drum 111. An exposure apparatus 113 of this type may be referred to as a light scanning device or the like, and a light emitting diode (LED) may be used as a light source.

The developer 114 accommodates a developing agent therein, and develops the electrostatic latent image into a visible image through supply of the developing agent onto the electrostatic latent image. The developer 114 may include a developing roller 117 that supplies the electrostatic latent image with the developing agent. For example, the developing agent may be supplied from the developing roller 117 to the electrostatic latent image formed on the photosensitive drum 111 through a developing electric field formed between the developing roller 117 and the photosensitive drum 111. The visible image which is formed on the photosensitive drum 111 is irradiated to a recording medium (P) by the transferring apparatus 115 or an intermediate transfer belt (not illustrated). The transfer apparatus 115 may transfer the visible image to a recording medium, for example, by the electrostatic transfer method. The visible image is attached to the recording medium (P) by electrostatic attraction.

The fuser 118 fixes a visible image on the recording medium P by applying heat and/or pressure to a visible image on the recording medium P. The printing operation is completed by this series of processes.

The motor 120 may perform an operation of rotating each configuration of the print engine 110 descried above. In various examples, one motor 120 may simultaneously rotate a plurality of configurations of the print engine 110 described above. Alternatively, a plurality of motors in combination may rotate the plurality of configurations described above.

In the example, only a configuration directly related to image forming is illustrated and described. However, the print engine 110 may further include a paper transferring apparatus (not shown) which moves papers loaded in the loading container to the transferring apparatus and the fuser described above. The configuration of such a paper transferring apparatus will be described with reference to FIG. 4.

Figure 4:
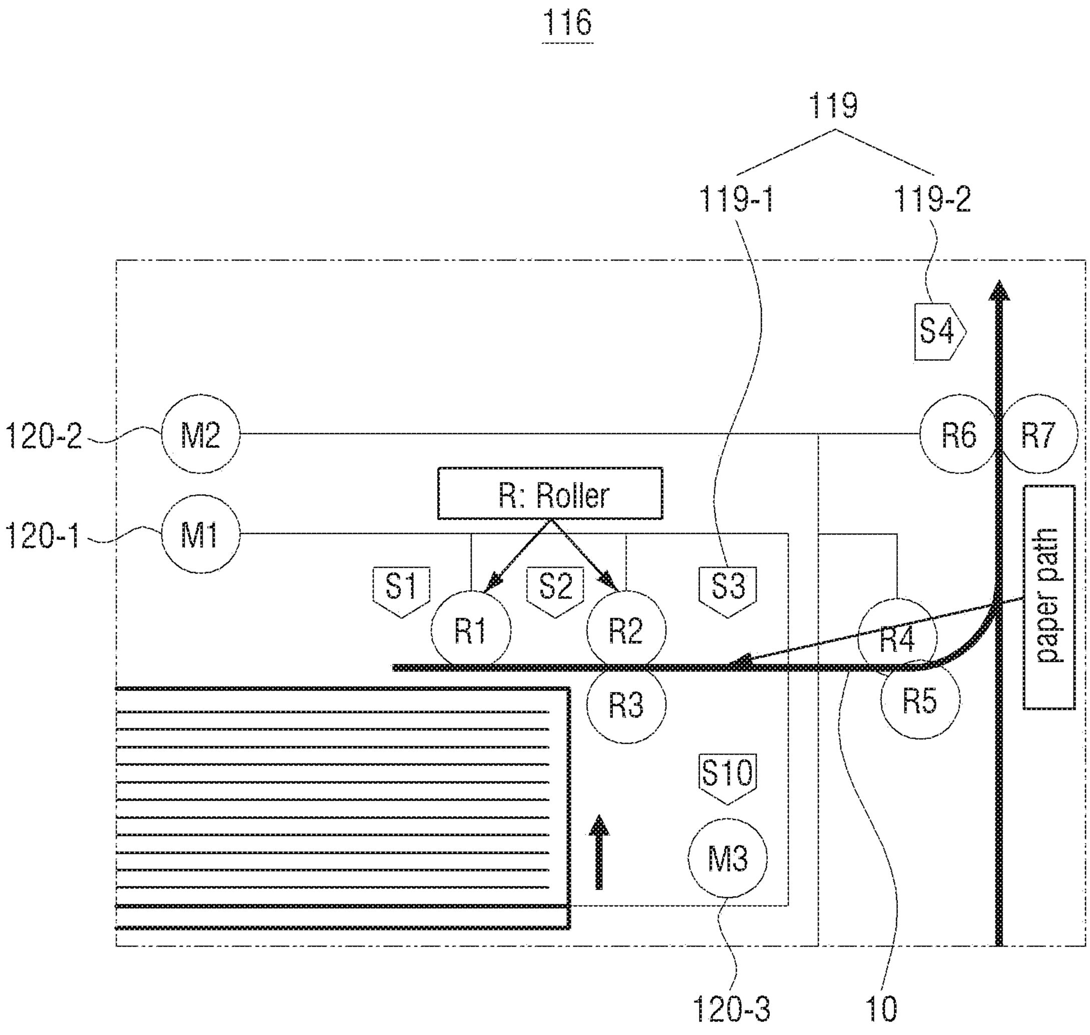
FIG. 4 is a diagram of a paper transferring apparatus, according to an example.

FIG. 4 is a diagram of a paper transferring apparatus, according to an example.

Referring to FIG. 4, a paper transferring apparatus 116 may move a printing paper loaded in a loading container to a predetermined paper transferring path 10. To this end, the paper transferring apparatus 116 may include a plurality of motors 120-1, 120-2, and 120-3 and structures R1, R2, R4, and R6 that are movable by the plurality of motors 120-1, 120-2, and 120-3.

The plurality of motors 120-1, 120-2, and 120-3 provides power for activating a structure. For example, a first motor 120-1 drives a plurality of rollers R1 and R2 to put a manuscript loaded in a loading container the paper transferring path 10.

In addition, a second motor 120-2 drives a plurality of rollers R4 and R6 to move printing papers discharged from a loading container to the transferring apparatus and the fuser.

A third motor 120-3 raises the printing paper in the loading container to the upper end and activates an instrument for bringing the printing paper into contact with the roller R1.

Through the configuration described above, when a print command is received, the processor 140 may provide a driving command to the plurality of motors 120-1 and 120-2 to operate a driving speed corresponding to a printing speed.

Based on the driving command, the plurality of motors 120-1 and 120-2 drives the structures R1, R2, R4 and R6 and accordingly, printing papers loaded in the loading container are moved to the transferring apparatus in the print engine 110.

To identify whether a jam has occurred in this process, a paper sensor 119, including paper sensors 119-1 and 119-2 disposed on the paper transferring path 10, may be used. When it is identified that a movement of paper is sequentially sensed according to a signal output from the paper sensor 119-1 and 119-2, the processor 140 identifies that a jam has not occurred. However, such a paper sensor 119 may be difficult to install because it needs to be disposed on the movement path of the paper.

A method of identifying whether a jam has occurred by sensing an amount of current supplied to the motor 120 and observing a change of load may be used. However, in that case, an average value of measured current and an amount of current during normal operation are compared with each other and thus, it is difficult to clearly distinguish a simple load increase due to a life of the motor 120 and an actual occurrence of a jam.

In an example, it is possible to analyze a frequency component for a current supplied to a motor by using data for an amount of current of a power supplied to the motor 120, and determine the occurrence of a jam based on the analysis result.

For example, when a jam in which a paper is rolled into rollers R1 and R2 while a paper is transferred from a loading container to a paper transfer line, an amount of current provided to a first motor 120-1 may be increased by the jamming. When a frequency component of current provided to the first motor 120-1 is analyzed, it may be identified that a size of a frequency band that is sensed is increased as compared with a frequency band that is sensed when the image forming apparatus is normally operated, and that a jam has occurred.

In the above example, only the operation of the paper transferring apparatus 116 disposed on the loading container side is described. However, the above-described operation may be applied on a moving path along which a printing paper in the print engine moves, for example, a path on which a printing paper input to a fuser is discharged.

Figure 5:
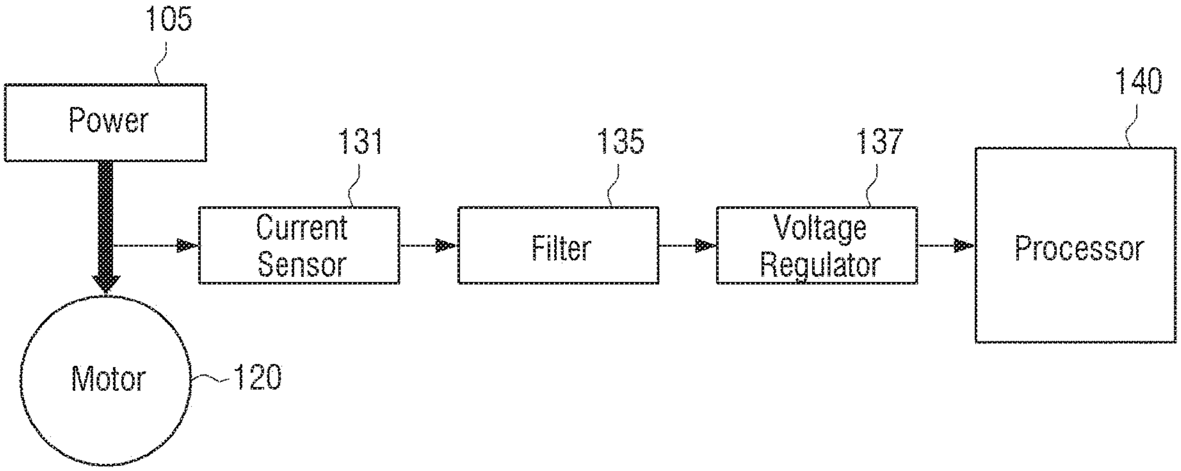
FIG. 5 illustrates a driving circuit, according to an example.

FIG. 5 illustrates a driving circuit, according to an example.

Figure 6:
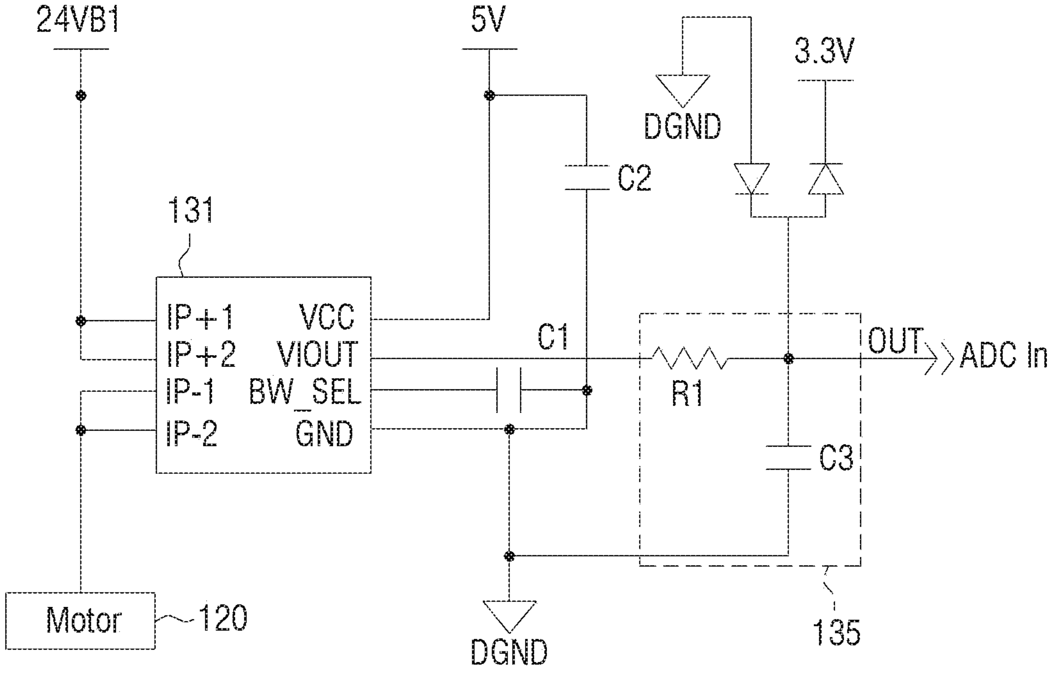
FIG. 6 is a circuit diagram of a current sensor and filter, according to an example.

FIG. 6 is a circuit diagram of a current sensor and a filter, according to an example.

Referring to FIG. 5, a driving circuit may include a current sensor 131, a filter 135, and a voltage regulator 137.

The current sensor 131 may determine an amount of current provided to a motor at predetermined time intervals, and output data for the amount of current. The predetermined time interval may be 1/Fs second (that is, Fs Hz), where the Fs refers to a sampling frequency.

For example, the current sensor 131 may sense a magnetic field generated by power provided from a power supply apparatus 105 to the motor, and output information relating to an amount of current corresponding to the sensed magnetic field of a voltage size.

Alternatively, the current sensor 131 may determine a voltage of a shunt resistance terminal by using a shunt resistance connected to one side of the motor 120. In addition, the current sensor 131 may output current data regarding an amount of current to the filter 135. The filter 135 may allow a pass-through of a frequency band to be sensed from among current data for an amount of current sensed through the current sensor 131, and filter out the remaining frequency bands.

In an example, a current provided to the motor 120 includes a frequency component of the motor 120 itself. Thus, it is possible to allow a pass-through of only a frequency band to be sensed and filter out the remaining frequency bands. To this end, the filter 135 may use a low pass filter or a band pass filter.

The voltage regulator 137 may regulate a level of current data output from the current sensor so that the current data level matches a voltage level of an ADC port (or terminal) of the processor 140. For example, it is possible to regulate a voltage level of current data so that a range between a minimum and maximum of a signal of a frequency band to be sensed includes the voltage level of the current data. To this end, the amplification, reduction, and level shift of a signal may be carried out.

Referring to FIG. 6, the power supply apparatus 105 may supply power to the motor 120 and the current sensor 131 may determine an amount of current provided to the motor 120. That is, the current sensor 131 may be disposed on a power supply line between an output terminal of the power supply apparatus and a power input terminal of the motor 120.

The current sensor 131 may output current data for the sensed current size to the filter 135. In addition, the filter 135 may output only a frequency band to be sensed by using a low pass filter including a resistance R1 and a capacitor C3.

A signal of a frequency band to be sensed that is output from the filter 135 may be input to the ADC port (or terminal) of the processor 140 via the voltage regulator 137.

In FIG. 6, the current sensor 131 senses an amount of current based on a magnetic field generated by a power supplied to the motor 120. However, in an implementation, it is possible to determine an amount of current by using a shunt resistance.

In addition, in FIG. 6, the driving circuit includes a current sensor 131 sensing an amount of current. However, in an implementation, the current sensor 131 may be a current sensor separated from the driving circuit.

Further, in FIG. 6, the filter 135 utilizes a low pass filter. However, in an implementation, the filter 135 may use a band pass filter.

FIGS. 7A to 7D and 8 are diagrams provided to explain a method for identifying whether a jam has occurred based on a frequency component, according to an example.

Hereinafter, for convenience of explanation, it will be assumed in FIGS. 7A to 7D and 8 that a determination of whether a jam has occurred is made based on a frequency component of current of a power supply provided to a motor driving a fuser in a print engine.

Accordingly, the frequency to be sensed may be, for example, a rotation frequency of a fusing roller such as a fuser belt or heat roller of a fuser, harmonics of a rotation frequency of a fusing roller, a mesh frequency of a gear rotating a fusing roller, or the like.

Figure 7A:
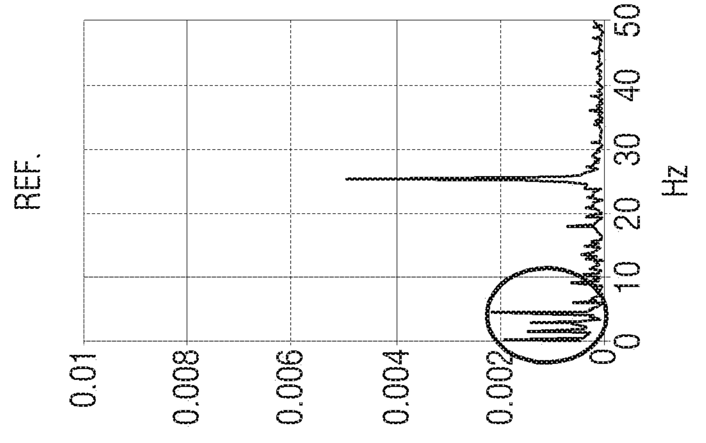
FIGS. 7A to 7D and 8 are diagrams provided to explain a method for identifying whether a jam has occurred based on a frequency component, according to an example.
Figure 7B:
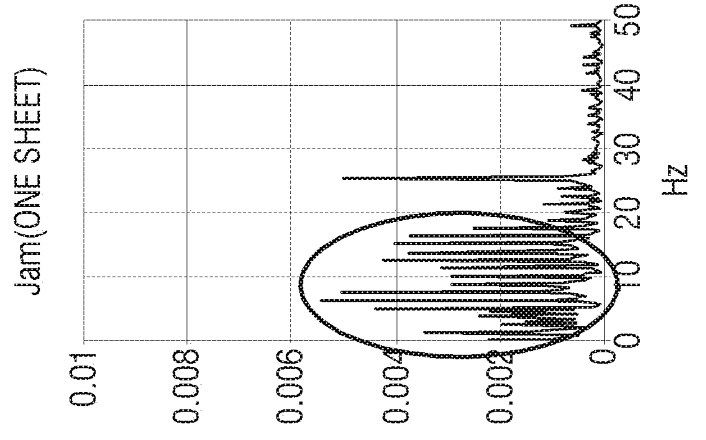
Figure 7C:
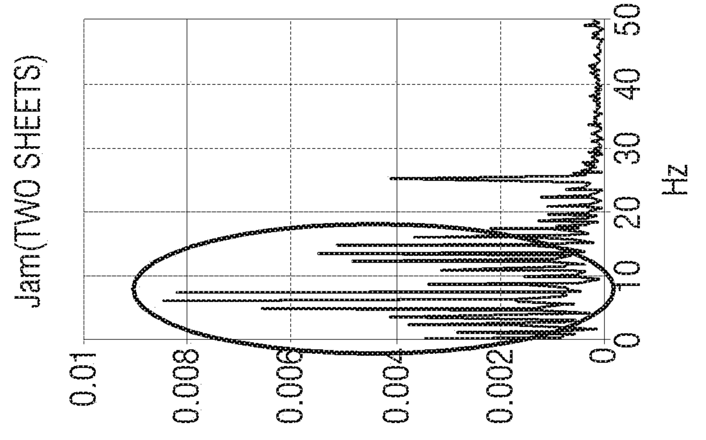
Figure 7D:
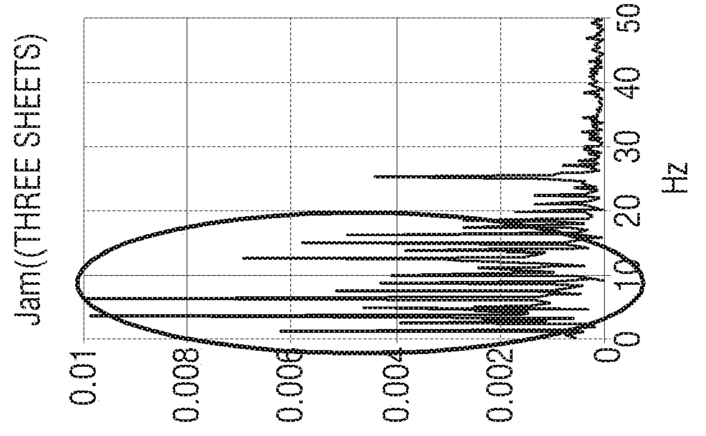

Referring to FIGS. 7A to 7D, it is possible to identify a size for each frequency band when an image forming apparatus is normally operated and a size for each frequency band when a jam has occurred. FIG. 7A illustrates a size for each frequency band when the image forming apparatus is normally operated. FIGS. 7B, 7C, and 7D illustrate a case where a jam has occurred by a piece of paper, a case where a jam has occurred by two pieces of paper, and a case where a jam has occurred by three pieces of paper, respectively.

As illustrated in FIG. 7A, it is possible to identify a size of a frequency band to be sensed when the image forming apparatus is normally operated and sizes of harmonic bands of a frequency band to be sensed. If a frequency to be sensed is 1.5 Hz, it is possible to identify not only a size of a frequency of 1.5 Hz but also sizes of harmonic bands of 3 Hz, 4.5 Hz, 6 Hz, 7.5 Hz, 9 Hz, etc. Referring to FIG. 7A, it may be identified that sizes of a frequency to be sensed and harmonic bands do not typically exceed 0.002.

In addition, as illustrated in FIGS. 7B, 7C, and 7D, it is possible to identify a size of a frequency band to be sensed and sizes of harmonic bands of a frequency band to be sensed when jamming occurs according to the number of sheets which cause the jamming. If a frequency to be sensed is 1.5 Hz, it is possible to identify not only a size of a frequency of 1.5 Hz but also sizes of harmonic bands of 3 Hz, 4.5 Hz, 6 Hz, 7.5 Hz, 9 Hz, etc. Referring to FIGS. 7B, 7C, and 7D, it may be identified that a frequency to be sensed and sizes of harmonic bands exceed 0.002, and that a size of a frequency component increases as the number of sheets which cause the jamming increases.

That is, a frequency to be sensed and frequency components of harmonic bands of the frequency to be sensed are characterized in that each size increases when a jam occurs, as compared with that during normal operation. In addition, as the number of sheets causing jamming increases, a size of the frequency increases even more. The processor 140 may determine that jamming occurs by using these characteristics.

As an example, a comparison may be made between a size of a frequency to be sensed during normal operation and a size of a frequency band to be sensed from among frequency components of a sensed current. If the difference exceeds a predetermined value, it may be determined that a jam has occurred.

In addition, through the above-described method, it is possible to not only compare frequency bands to be sensed from among the entire frequency band but also determine whether a jam has occurred through comparison between harmonic bands of a frequency band to be sensed.

Figure 8:
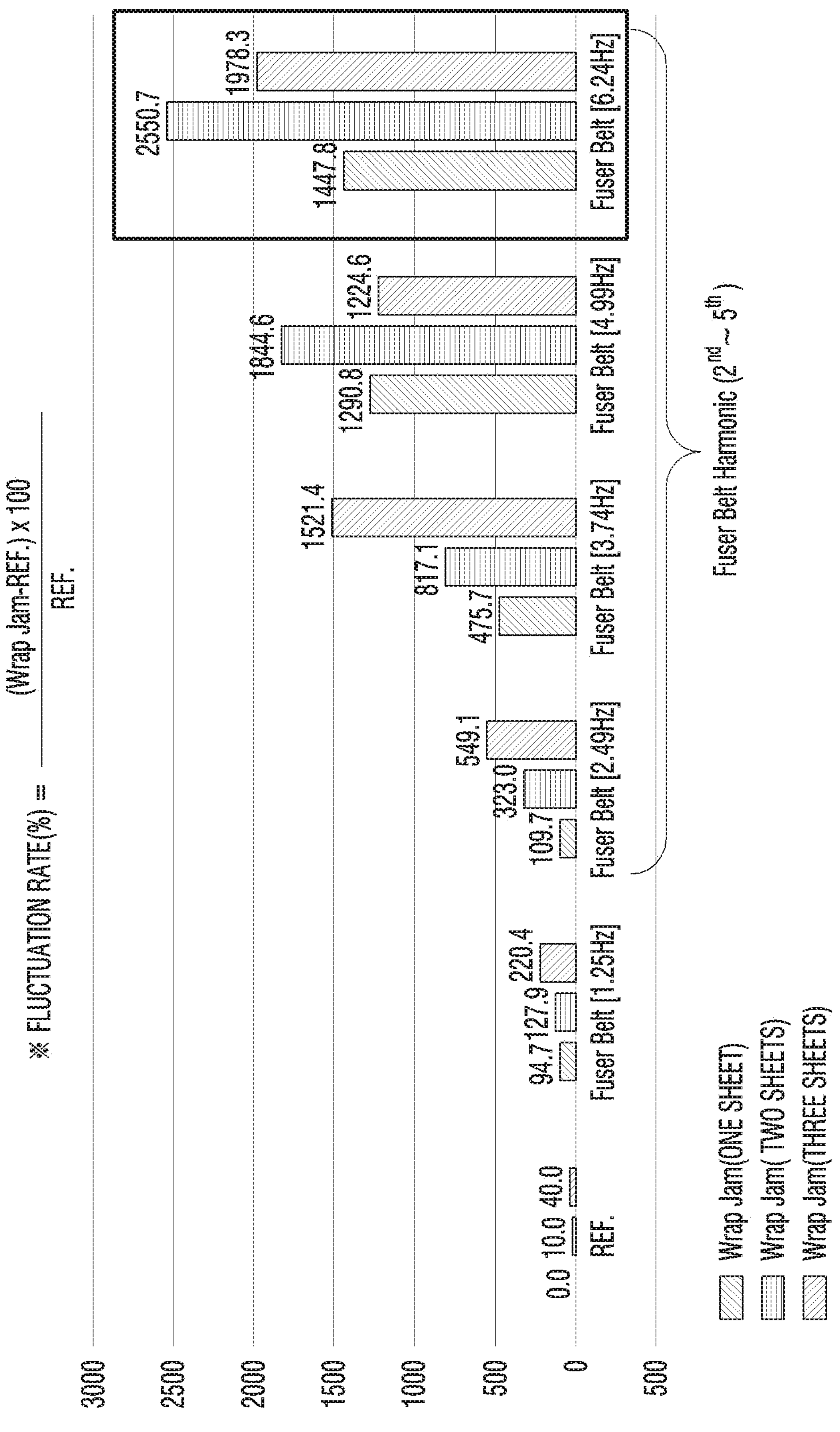

Referring to FIG. 8, it is possible to identify a fluctuation rate of a size for each frequency band when a jam occurs, as compared with a size of a frequency band to be sensed during normal operation. For convenience of explanation, an example will be described in which a frequency to be sensed is a rotation frequency of a fuser belt of a fuser, which is 1.25 Hz.

The second and third bar graphs of "REF" of FIG. 8 refer to fluctuation rates of a size of a frequency band to be sensed when the image forming apparatus is normally operated and two or three sheets are input together, as compared with a size of a frequency band to be sensed during normal operation, which may be identified to have fluctuation rates of 10% and 40%, respectively.

In addition, referring to each bar graph of "Fuser Belt [1.25 Hz]" of FIG. 8, according to the number of sheets which cause jamming, a fluctuation rate of a size of a frequency band to be sensed of a sensed current as compared with a size of a frequency band to be sensed during normal operation may be identified.

For example, the first bar graph of "Fuser Belt [1.25 Hz]" may refer to a fluctuation rate of a size of a frequency to be sensed in a case where a jam has occurred by a sheet of paper. The second bar graph may refer to a fluctuation rate of a size of a frequency to be sensed in a case where a jam has occurred by two sheets of paper. The third bar graph may refer to a fluctuation rate of a size of a frequency to be sensed in a case where a jam has occurred by three sheets of paper. Referring to each of bar graphs of "Fuser Belt [1.25 Hz]", it is possible to identify that the graphs show a fluctuation of at least 94.7% up to 220.4% as compared with a size of the frequency during normal operation.

In addition, referring to each of bar graphs of "Fuser Belt [2.49 Hz]" of FIG. 8, according to the number of sheets which cause jamming, a fluctuation rate of a size of a first harmonic band of a frequency to be sensed of a currently-sensed current as compared with a size of a frequency band to be sensed during normal operation may be identified.

That is, the first bar graph of "Fuser Belt [2.49 Hz]" may refer to a fluctuation rate of a size of a first harmonic band of a frequency to be sensed in a case where a jam has occurred by a sheet of paper. The second bar graph may refer to a fluctuation rate of a size of a first harmonic band of a frequency to be sensed in a case where a jam has occurred by two sheets of paper. The third bar graph may refer to a fluctuation rate of a size of a first harmonic band of a frequency to be sensed in a case where a jam has occurred by three sheets of paper. Referring to each of bar graphs of "Fuser Belt [2.49 Hz]", it is possible to identify that the graphs show a fluctuation of at least 109.7% up to 549.1% as compared with a size of the frequency during normal operation.

That is, when a jam occurs, a fluctuation rate of a size of a frequency component of a sensed current increases significantly. The processor 140 may determine a jamming by using this characteristic.

As an example, the processor 140 may determine a fluctuation rate of a size of a frequency band to be sensed from among frequency components of a sensed current. If the determined fluctuation rate exceeds a predetermined fluctuation rate, the processor 140 may identify that a jam has occurred.

In addition, the processor 140 may determine a fluctuation rate of a size of a harmonic band of a frequency band to be sensed from among frequency components of a sensed current. If the determined fluctuation rate exceeds a predetermined fluctuation rate, the processor 140 may identify that a jam has occurred.

Figure 9:
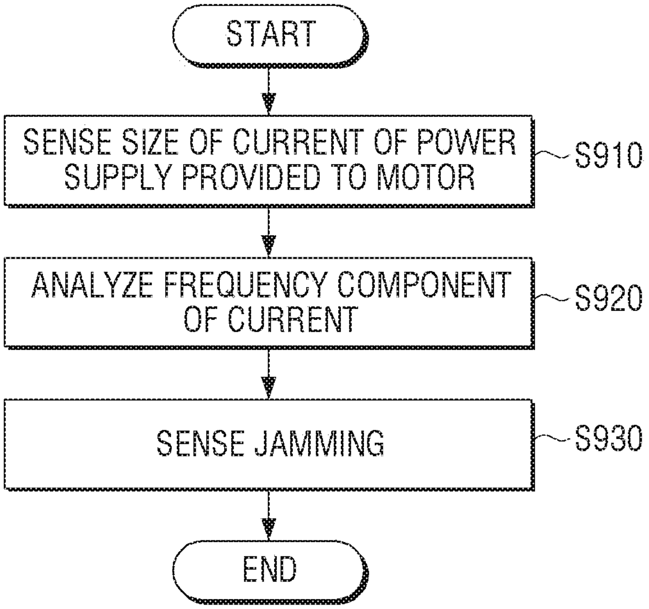
FIG. 9 is a flowchart provided to explain a control method, according to an example.

FIG. 9 is a flowchart provided to explain a control method, according to an example.

Referring to FIG. 9, an amount of current of a power supplied to a motor starting a print engine may be sensed at operation S910. For example, an amount of current of a power supplied to a motor at predetermined time intervals may be sensed using a current sensor. The predetermined time intervals may be 1/Fs, where the Fs refers to a sampling frequency.

A frequency component of a current of a power supplied to the motor is analyzed at operation S920. As an example, it is possible to calculate a function in a time domain representing a current provided to a motor by using size data of a current sensed using a current sensor, and transform the calculated function onto a frequency domain. A method for transforming a calculated function into a frequency component may include a method of transform to an expression of amplitude and phase, a Laplace transform, a Z transform, a Fourier transform, etc.

Whether jamming has occurred is determined based on the analyzed frequency component at operation S930. As an example, it is possible to determine an occurrence of jamming using a frequency component corresponding to a frequency band to be sensed, without using a frequency component of the entire frequency band from among the analyzed frequency components.

For example, in a case in which a jam in a form that a paper is rolled in a fuser is to be sensed, a target of current sensing of a current sensor is a current provided to a motor driving the fuser. In addition, the frequency to be sensed may be, for example, a rotation frequency of a fusing roller such as a fuser belt or heat roller of a fuser, harmonics of a rotation frequency of a fusing roller, a mesh frequency of a gear rotating a fusing roller, or the like.

In more detail, it is possible to identify a size of a frequency band to be sensed from among the analyzed frequency component, and determine jamming by comparing the identified size with a size of a frequency band to be sensed during normal operation.

In addition, in a case in which a ratio of a size of a frequency band to be sensed from among the analyzed frequency component to a size of a frequency band to be sensed during normal operation exceeds a predetermined standard, it may be determined that a jam has occurred.

In addition, it is possible to determine an average value of amounts of current sensed by a current sensor, and determine an occurrence of a jam based on both the determined average value and the analyzed frequency component.

In addition, it is possible to determine an occurrence of a jam using an amount of current of a power supplied to a motor sensed by a current sensor for a measurement time corresponding to a frequency to be sensed.

As an example, to obtain a frequency component corresponding to a frequency band to be sensed, a frequency resolution at a predetermined level is necessary. The frequency resolution is characterized in that it is changed according to a measurement time and a frequency to be sensed. Accordingly, to obtain a predetermined level of frequency resolution, it is necessary that a measurement time differs depending on a frequency to be sensed.

As described above, an image forming method according to an example may include determining whether a jam has occurred without using a paper sensor sensing whether a paper input into an image forming apparatus is discharged. Accordingly, a structure of an image forming apparatus may be further simplified and a circuit configuration is easier and thus may be realized at a lower cost.

In addition, an image forming method according to an example may include determining an occurrence of a jam by analyzing a frequency component of a current provided to a motor rather than comparing a change in an amount of current provided to the motor with an amount of current during normal operation. Accordingly, a case of a simple load increase due to a life of a motor, etc. and a case of an actual occurrence of a jam may be distinguished from each other.

In addition, a method of controlling an image forming apparatus may be realized as at least one execution program to execute any of the above-described methods for controlling the image forming apparatus, and such an execution program may be stored in a non-transitory readable recording medium.

A non-transitory computer readable medium may refer to a machine-readable medium or device that stores data semi-permanently and not for a short period of time, such as a register, cache, memory, and the like. In more detail, the above-described various applications or programs may be stored in the non-transitory computer readable medium, for example, a compact disc (CD), a digital versatile disc (DVD), a hard drive, a Blu-ray disc, a USB, a memory card, a read only memory (ROM), and the like, and may be provided.

While the general inventive concept has been shown and described with reference to certain examples thereof, it will be understood by those skilled in the art that various changes in form and detail may be made therein without departing from the spirit and principles of the present general inventive concept, the scope of which is defined by the appended claims and their equivalents.

What is claimed is:

1. An image forming apparatus, comprising:

a print engine to perform an image forming job;

a motor to drive a fuser;

a driving circuit, to supply a power to the motor, and including a sensor to sense an amount of current of the power supplied to the motor; and a processor, in a case in which a warm-up of the fuser is required, to analyze a frequency component of the current supplied to the motor by using the amount of current sensed by the sensor for a predetermined time, and to determine an occurrence of a jam in the fuser based on a predetermined frequency band in the analyzed frequency component corresponding to pre-stored information relating to the predetermined frequency band during a paper jam, wherein the processor identifies the predetermined frequency band from among the analyzed frequency component and determines the occurrence of a jam based on the magnitude of the predetermined frequency band in the analyzed frequency component and pre-stored information relating to the frequency component during normal operation, wherein the processor, based on the jam occurring, suspends an operation currently in progress.

2. The image forming apparatus as claimed in claim 1, wherein the processor performs a Fourier Transform with respect to a size of current sensed by the sensor for the predetermined time, and analyzes the frequency component by using a result of the Fourier Transform.

3. The image forming apparatus as claimed in claim 1, wherein the processor identifies the predetermined frequency band from among the analyzed frequency component, and determines a number of sheets of the jam based on a size of the predetermined frequency band in the analyzed frequency component and pre-stored information relating to the frequency component during a normal operation.

4. The image forming apparatus as claimed in claim 3, wherein the processor determines the number of sheets of the jam based on a ratio of the predetermined frequency band in the analyzed frequency component to the predetermined frequency band in the frequency component during a normal operation.

5. The image forming apparatus as claimed in claim 3, wherein the processor analyzes the frequency component of the current provided to the motor by using a size of current sensed by the sensor for a time corresponding to the predetermined frequency band.

6. The image forming apparatus as claimed in claim 1, wherein the processor determines an average value of the amount of current sensed by the sensor for the predetermined time, and determines the occurrence of the jam based on the determined average value and the analyzed frequency component.

7. An image forming apparatus, comprising:

a print engine to perform an image forming job;

a motor to drive a fuser;

a driving circuit, to supply a power to the motor, and including a sensor to sense an amount of current of the power supplied to the motor; and a processor, in a case in which a warm-up of the fuser is required, to analyze a frequency component of the current supplied to the motor by using the amount of current sensed by the sensor for a predetermined time, and to determine an occurrence of a jam in the fuser based on a predetermined frequency band in the analyzed frequency component corresponding to pre-stored information relating to the predetermined frequency band during a paper jam, wherein the processor identifies the predetermined frequency band from among the analyzed frequency component and determines the occurrence of a jam based on the magnitude of the predetermined frequency band in the analyzed frequency component and pre-stored information relating to the frequency component during normal operation, wherein the processor, based on the jam occurring, regulates a preset fusing temperature of a fuser in the print engine to be lower than a predetermined value.

8. The image forming apparatus as claimed in claim 7, wherein the processor, based on the jam occurring, controls the fuser not to be heated.

9. A method for controlling an image forming apparatus, the method comprising:

sensing an amount of current of a power supplied to a motor to drive a fuser for a predetermined time by using a sensor;

analyzing a frequency component for the current supplied to the motor by using the sensed amount of current in a case in which a warm-up of the fuser is required; and determining an occurrence of a jam in the fuser based on the analyzed frequency component based on a predetermined frequency band in the analyzed frequency component corresponding to pre-stored information relating to the predetermined frequency band during a paper jam, wherein the occurrence of a jam is determined based on the magnitude of the predetermined frequency band in the analyzed frequency component and pre-stored information relating to the frequency component during normal operation, wherein the processor, based on the jam occurring, suspends an operation currently in progress.

10. The method as claimed in claim 9, wherein the analyzing the frequency component comprises:

performing a Fourier Transform with respect to a size of current sensed by the sensor for the predetermined time; and analyzing the frequency component by using a result of the Fourier Transform.

11. The method as claimed in claim 9, further comprising determining a number of sheets of the jam by:

identifying the predetermined frequency band from among the analyzed frequency component; and determining the number of sheets of the jam based on a size of the predetermined frequency band in the analyzed frequency component and pre-stored information relating to the frequency component during a normal operation.

12. The method as claimed in claim 11, wherein the determining of the occurrence of the number of sheets of the jam comprises determining the number of sheets of the jam based on a ratio of the predetermined frequency band in the analyzed frequency component to the predetermined frequency band in the frequency component during a normal operation.

13. The method as claimed in claim 11, wherein the sensing of the amount of current comprises sensing the amount of current of the power supplied to the motor driving the print engine for a time corresponding to the predetermined frequency band by using the sensor.

14. The method as claimed in claim 9, wherein the determining of the occurrence of the jam comprises:

determining an average value of the amount of current sensed by the sensor for the predetermined time; and determining of the occurrence of the jam based on the determined average value and the analyzed frequency component.

15. An image forming apparatus, comprising:

a fuser to perform an image forming job;

a motor to drive a fusing roller;

a driving circuit, to supply a power to the motor, and including a sensor to sense an amount of current of the power supplied to the motor; and a processor, in a case in which a warm-up of the fuser is required, to analyze a frequency component of the current supplied to the motor corresponding to a rotation frequency band of the fusing roller, and to determine an occurrence of a jam in the fuser based on a predetermined frequency band in the analyzed frequency component corresponding to pre-stored information relating to the predetermined frequency band during a paper jam, wherein the processor identifies the predetermined frequency band from among the analyzed frequency component and determines the occurrence of a jam based on the magnitude of the predetermined frequency band in the analyzed frequency component and pre-stored information relating to the frequency component during normal operation, wherein the processor, based on the jam occurring, suspends an operation currently in progress.

16. The image forming apparatus as claimed in claim 15, wherein the processor performs a Fourier Transform with respect to a size of current sensed by the sensor for the predetermined time, and analyzes the frequency component by using a result of the Fourier Transform.

17. The image forming apparatus as claimed in claim 15, wherein the processor identifies the predetermined frequency band from among the analyzed frequency component, and determines a number of sheets of the jam based on a size of the predetermined frequency band in the analyzed frequency component and pre-stored information relating to the frequency component during a normal operation.

18. The image forming apparatus as claimed in claim 17, wherein the processor determines the number of sheets of the jam based on a ratio of the predetermined frequency band in the analyzed frequency component to the predetermined frequency band in the frequency component during a normal operation.

19. The image forming apparatus as claimed in claim 15, wherein the processor determines an average value of the amount of current sensed by the sensor for the predetermined time, and determines the occurrence of the jam based on the determined average value and the analyzed frequency component.

* * * * *